Figure 1:
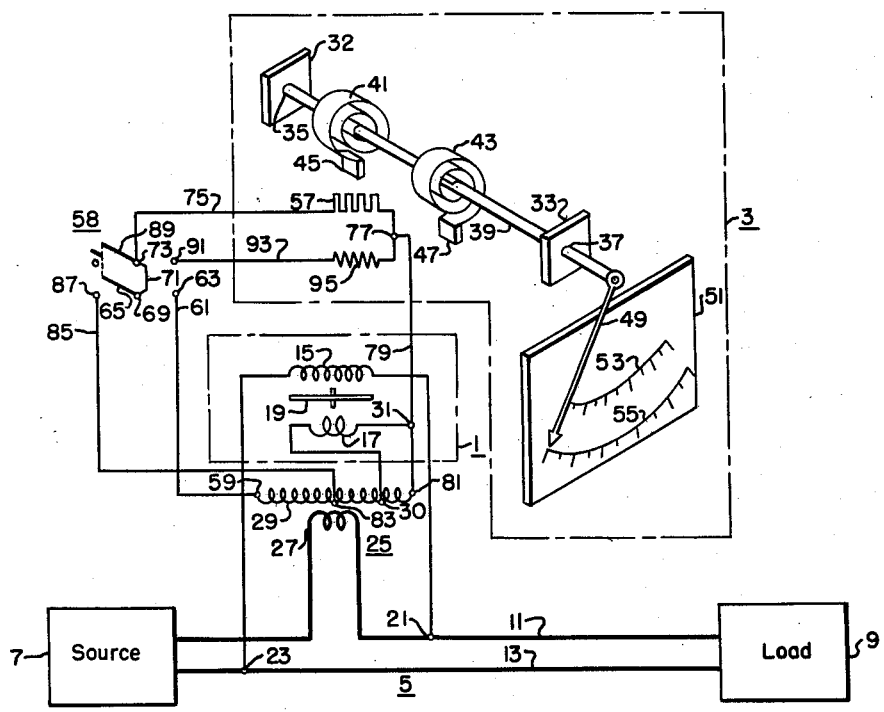

Sept. 22, 1959  G. W. LIPSCOMB  2,905,900
ELECTRICAL MEASURING DEVICE
Filed Jan. 15, 1957

WITNESSES:
Bernard R. Gieguy
Wm. B. Sellers.

INVENTOR
George W. Lipscomb
BY
David M. Schiller
ATTORNEY

United States Patent Office 2,905,900
Patented Sept. 22, 1959

2,905,900

ELECTRICAL MEASURING DEVICE

George W. Lipscomb, Raleigh, N.C., assignor to Westinghouse Electric Corporation, East Pittsburgh, Pa., a corporation of Pennsylvania Application January 15, 1957, Serial No. 634,245

2 Claims. (Cl. 324—127)

This invention relates to electrical measuring devices and has particular relation to multiple range measuring devices for measuring a quantity of an electrical circuit.

In certain measuring installations it has been found desirable to employ instruments of the so-called multiple range type which permit an indication or recording of a measured quantity over a number of different ranges of values of the quantity. Although the invention has many and varied uses, it will be described in connection with a multiple range instrument of the indicating type which includes an indicating pointer movable relative to a plurality of indicating scales in response to energization of the instrument.

Such indicating instruments may include a pair of indicating scales which are calibrated to provide two different ranges of values of a measured quantity. The scales are arranged such that the indicating pointer at one position of its path of movement indicates selectively two different values of the measured quantity which may, for example, comprise the full scale values of the two scales. In certain installations difficulty has previously been experienced in the calibration of such multiple scale instruments. For example, it has been observed that when such an instrument is calibrated to read correctly a full scale value for a selected range of values, an incorrect full scale reading results when a different range of values is selected. This problem is particularly troublesome in installations where conversion means such as instrument transformers have been employed to energize the instrument from a circuit.

According to the present invention, a measuring device is provided which includes a multiple range instrument with means for permitting the selection of a desired range without the necessity of calibrating the instrument subsequent to each selection. In a preferred embodiment of the invention, the measuring device includes a current responsive thermal instrument arranged for energization from a circuit through a current transformer. The device includes a pair of current paths each connecting the instrument for energization in accordance with the secondary current of the transformer. The paths are connected to the transformer to deliver to the instrument equal values of the secondary current for two different values of the current of the circuit which is to be measured. With this arrangement each of the paths may be utilized for a separate range of values of the circuit current to be measured. Suitable switch means are employed to establish a selected one of the paths to thereby permit selection of the desired range.

In order to calibrate such a multiple range instrument, the indicating pointer is set to indicate correctly the full scale value of the circuit current for a selected one of the scales. With such a setting, the pointer also indicates the full scale value of the remaining one of the two scales. It is observed, however, that when the remaining scale is utilized to indicate a value of the circuit current corresponding to the full scale value of the remaining scale, the indicating pointer is moved from its initial position to provide an incorrect reading at the full scale position of the remaining scale. Consequently, the instrument must be recalibrated to indicate correctly the full scale value of the remaining scale.

It has been observed that such variation in the response of the instrument upon the selection of a different scale is caused to a great extent by a characteristic of the associated current transformer. This characteristic is the transformer ratio error which results in the deviation of the secondary currents delivered by the two energizing paths from a desired condition of equality for the two different full scale values of the circuit current. The present invention provides compensating means for providing the desired equal values of the secondary current for the two different full scale values of the circuit current.

In a preferred embodiment of the invention, the compensating means is in the form of a shunt current path connected to shunt a portion of the secondary current delivered by one of the energizing paths away from the instrument to provide the desired condition of equality of the secondary currents in the two paths. With this arrangement, the value of the secondary current energizing the instrument is the same regardless of which of the two paths is employed. Consequently, the position of the indicating pointer will remain the same during the selection of a desired scale.

It is, therefore, an object of the invention to provide an improved electrical measuring device.

It is another object of the invention to provide an electrical measuring device including a multiple range instrument with improved means for permitting the selection of a desired range without the necessity of calibrating the instrument subsequent to each selection.

It is a further object of the invention to provide an electrical measuring device including a multiple range instrument energizable from a circuit through a transformer with improved means for compensating for a characteristic of the transformer which required the recalibration of the instrument subsequent to each selection of a desired range.

Figure 2:
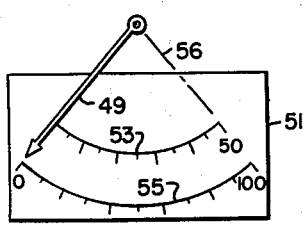

Other objects of the invention will become apparent from the following description taken in conjunction with the accompanying drawings, in which:

Figure 1 is a schematic representation of an electrical measuring device constructed in accordance with the teachings of the invention; and Fig. 2 is a view in front elevation of a pointer and scale arrangement for the device of Fig. 1.

Referring to the drawings there is schematically illustrated in Fig. 1 an electrical measuring device constructed in accordance with the teachings of the invention. The device is shown in Fig. 1 as including a conventional watt-hour meter represented diagrammatically by the block 1. The meter 1 is illustrated in association with a measuring instrument represented diagrammatically by the block 3. The meter 1 and instrument 3 may constitute together a combined energy and current measuring device for measuring the energy and current present in an electrical circuit.

The measuring device may be associated with any suitable electrical circuit. As illustrated in Fig. 1, the measuring device is associated with a circuit represented generally by the numeral 5 which may include a suitable source of electrical voltage 7 for supplying energy to a suitable load device 9 over a pair of conductors 11 and 13. For purposes of discussion it will be assumed that the circuit 5 is a single phase alternating current circuit operating at a frequency of 60 cycles per second.

The watt-hour meter 1 may be of conventional construction and is illustrated as including a voltage winding 15 and a current winding 17 which may be associated with a suitable magnetic structure (not shown).

As is understood in the art, the windings 15 and 17 are effective when energized from an alternating current circuit to produce a shifting magnetic field which may be employed to effect rotation of a suitable electroconductive armature 19. Rotation of the armature 19 may be made to provide an indication of the energy of the circuit 5 by connecting the windings 15 and 17 to the circuit 5 in the manner illustrated in Fig. 1.

As shown in Fig. 1, the voltage winding 15 includes a pair of terminals 21 and 23 which are connected respectively to the conductors 11 and 13 of the circuit 5. With this arrangement, the winding 15 is connected for energization in accordance with voltage between the conductors 11 and 13 of the circuit 5. In order to effect energization of the winding 17 from the circuit 5, suitable conversion means in the form of a current transformer 25 may be provided. The transformer 25 includes a primary winding 27 which is shown connected in series with the conductor 11 of the circuit 5. The transformer 25 further includes a secondary winding 29 which is effective to produce a secondary current having a value proportional to the value of current in the circuit 5 in response to energization of the winding 27. The winding 17 of the meter 1 includes a pair of terminals 30 and 31 which are connected to spaced points of the secondary winding as shown in Fig. 1. Such arrangement results in energization of the winding 17 in accordance with current of the circuit 5.

The instrument 3 may be associated with the meter 1 in a common housing for measuring a quantity of the circuit 5. Although the instrument 3 may be employed for measuring voltage and volt amperes of the circuit 5, it will be assumed for purposes of discussion that the instrument 3 is arranged to provide an indication of current flowing in the circuit 5. As illustrated in Fig. 1, the instrument 3 includes a stator structure having spaced portions 32 and 33 for supporting the moving system of the instrument 3. For this purpose the portions 32 and 33 may be provided respectively with suitable openings 35 and 37 constituting bearing means for supporting a shaft 39 for rotation about the axis of the shaft.

Any suitable means may be employed for effecting rotation of the shaft 39 in accordance with the current of the circuit 5. As illustrated in Fig. 1, the instrument 3 may be of the thermal type including thermal responsive bimetallic means effective when heated for rotating the shaft 39. The bimetalic means is illustrated in the form of a spiral spring 41 which may be constructed of two or more layers of different metallic materials having different thermal expansion properties. It is noted that the inner end of the spring 41 is secured to the shaft 39 whereas the outer end of the spring is secured to a portion 45 of the stator structure.

In order to compensate the instrument 3 for variations in ambient temperature, there is provided an additional spring 43 which may be of identical construction as the spring 41. In order to provide such compensation the spring 43 is wound in opposition to the spring 41 about the shaft 39. The inner end of the spring 43 is secured to the shaft 39 with the outer end being secured to a portion 47 of the stator structure. With this arrangement, the springs 41 and 43 are effective when heated to rotate the shaft 39 in opposite directions. Consequently, when the springs 41 and 43 are heated to the same degree, no rotation of the shaft 39 takes place.

In order to permit the indication of the value of a quantity energizing the instrument 3, a suitable moving element 49 shown in the form of an indicating pointer is secured to an end of the shaft 39. The pointer 49 is movable in accordance with rotation of the shaft 39 to traverse suitable indicating scale means 51 in response to energization of the instrument 3. The scale means 51 preferably comprises a pair of suitably calibrated scales 53 and 55 which are provided to permit the indication of different ranges of values of the quantity energizing the instrument.

As best shown in Fig. 2 the scales 53 and 55 are arranged with respect to the pointer 49 such that the pointer 49 at one position in its path of movement indicates two different values of the energizing quantity on the scales 53 and 55. For example, when the pointer 49 is in the position indicated by the broken line 56, it indicates the full scale values of the energizing quantity for both of the scales. In Fig. 2 the scale 53 is shown as having a full scale value of 50 units whereas the scale 55 is shown as having a full scale value of 100 units. If the instrument 3 is employed to measure current, the scales 53 and 55 may be calibrated in amperes to have respectively full scale values of 50 amperes and 100 amperes.

The spring 41 may be heated in any suitable manner. As illustrated in Fig. 1 heating means in the form of a suitable resistor 57 is provided for heating the spring 41 in accordance with current flowing through the resistor. The resistor 57 is connected for energization from the transformer 25 in accordance with the secondary current of the transformer. In order to control the path of energization of the resistor 57, a suitable switch device 58 is provided which is of the double-throw double-pole type. The switch 58 has two operating positions each of which is effective to establish a separate path of energization for the resistor 57. In one position the switch 58 establishes a path which extends from one terminal 59 of the secondary winding 29 of the transformer through a conductor 61, a switch terminal 63, an arm 65 of the switch, a terminal 69, a conductor 71, a terminal 73, a conductor 75, the resistor 57, and a terminal 77 back to the other terminal 81 of the winding 29 through a conductor 79. When the switch 58 is in its other operating position, a path is established which extends from a center tap connection 83 of the winding 29 through a conductor 85, a terminal 87, the switch arm 65, the terminal 69, the conductor 71, the terminal 73, the conductor 75, the resistor 57, the terminal 77 and back to the terminal 81 through the conductor 79.

It is observed that with this arrangement a desired path of energization for the resistor 57 may be selected by operation of the switch 58 to one or the other of its operating positions. It is noted that the two energizing paths deliver different values of secondary current to the resistor 57 for the same energizing current of the circuit 5. As illustrated the path which includes the conductor 85 delivers substantially twice the value of current to the resistor as does the path which includes the conductor 61 for the same energizing current. Such connections of the energizing paths permit a separate one of the paths to be employed for each range of values of the current of the circuit 5 which are indicated by the scales 53 and 55.

In order to calibrate the instrument 3, one of the energizing paths may be established by the switch 89 and the instrument energized by a current which is equal to the full scale current for the scale corresponding to the established path. If the pointer 49 does not correctly indicate such full scale value the pointer may be set by any suitable means to indicate the correct full scale value. This operation is effective to correctly calibrate the instrument 3 for a selected one of the scales 53 and 55. In order to avoid recalibration of the instrument when the switch 58 is actuated to establish the remaining energizing path corresponding to the other of the scales 53 and 55, it is necessary that the two paths deliver equal values of the secondary current to the resistor 57 for the two different full scale values of the scales 53 and 55. It has been observed, however, that the two energizing paths supply secondary currents which deviate from this desired equality for energization of the instrument by the two different full scale currents. This is an undesirable situation and necessitates the recalibration of the instrument 3 subsequent to each operation of the switch 58.

This undesirable condition is caused by so-called ratio errors which are present in transformers such as the transformer 25. The ratio errors of the transformer 25 is a condition wherein the ratio of the current energizing the winding 27 to the current flowing in the winding 29 deviates from the ratio of the number of turns of the winding 29 to the number of turns of the winding 27. The effect of such ratio errors may be explained by a consideration of the following example.

Let it be assumed that the winding 27 has a total of two turns and that the winding 29 has a total of 12 turns with 6 turns in each half of the winding 29. Let it be further assumed that the voltage of the source 7 is equivalent to 240 volts. Under ideal conditons we would expect for a current of 50 amperes in the winding 27 that a current of 16.67 amperes would flow through the path including the conductor 85. Also for a current of 100 amperes in the winding 27 the same current of 16.67 amperes would be expected to flow through the path including the conductor 61. For such conditions the two energizing paths would deliver to the resistor 57 equal values of current for the two different values of current energizing the winding 27.

Under actual operating conditions, however, a portion of the ampere turns of the winding 27 is utilized to provide exciting current for supplying losses of the transformer. It has been observed that for a current of 50 amperes in the winding 27 approximately 15.6 amperes will flow through the resistor 57 when the path including the conductor 85 is established. Furthermore, for a current of 100 amperes in the winding 27 it is observed that a current of approximately 16.4 amperes flows through the resistor 57 when the path including the conductor 61 is established. It is, therefore, noted that although the two paths are connected such that one path will supply twice the current of the other path, energization of the winding 27 by two currents having the same ratio as the turns ratio does not result in equal currents flowing through the resistor 57. This condition then necessitates the recalibration of the instrument 3 subsequent to each operation of the switch 50.

In accordance with the present invention, the deviation from the desired equal condition of the currents supplied by the two energizing paths is compensated by providing suitable compensating means effective to equalize these currents. As shown in Fig. 1 the compensating means is in the form of a shunt current path including a conductor 93 and a series-connected impedance in the form of a resistor 95 connected to shunt a portion of the secondary current delivered by one of the paths away from the resistor 57. The resistor 95 is selected such that the portion of secondary current shunted is sufficient to cause equal currents to flow through the resistor 57 for energization of the winding 27 by the full scale currents as indicated by the scales 53 and 55.

It will be recalled that in the specific example previously discussed, a current of 15.6 amperes flows through the resistor 57 for a current of 50 amperes in the winding 27, and a current of 16.4 amperes flows through the resistor 57 for a current of 100 amperes in the winding 27. It is observed then that current delivered by the path including the conductor 61 is greater by .8 amperes than current delivered by the path including the conductor 85. In order to equalize these currents the conductor 93 and resistor 95 are series connected between the terminals 91 and 77 to shunt current delivered by the path including the conductor 61. The value of the resistor 95 is selected such that the value of the shunted current is approximately .8 amperes. This results in equal currents delivered by the two paths of approximately 15.6 amperes for the two full scale energizing currents of 50 and 100 amperes. With this arrangement, calibration of the instrument 3 to indicate correctly the full scale value for the scale 55 will also provide a correct indication of the full scale value for the scale 53 for energization of the winding 27 by such full scale currents.

Although the invention has been described with reference to certain specific embodiments thereof, numerous modifications are possible and it is desired to cover all modifications falling within the spirit and scope of the invention.

I claim as my invention:

1. In a device responsive to an electrical quantity of an electrical circuit, transformer means including primary winding means to be connected for energization from said circuit in accordance with an electrical quantity of said circuit, and secondary winding means, a measuring instrument, input terminal means for said instrument, first and second current paths connected to spaced points of said secondary winding means each to deliver when established to said terminal means a separate energization, said transformer means having a characteristic such that said separate energizations deviate from a desired condition of equality for two different values of said electrical quantity, a third current path connected in shunt relation with said terminal means, said third path being effective when established to shunt a preselected portion of the energization delivered by said first path away from said terminal means to equalize said energizations, a switch element actuable between first and second operating positions, said switch element being effective when actuated from said first position to said second position to simultaneously establish said first and third paths and to interrupt said second path, said switch element being additionally effective when actuated from said second position to said first position to establish said second path and to interrupt said first and third paths, said switch element being ineffective to modify appreciably the impedance external to said secondary winding means in series with said terminal means when actuated between said first and second positions.

2. In a device responsive to an electrical quantity of an electrical circuit, transformer means including primary windings means to be connected for energization from said circuit in accordance with an electrical quantity of said circuit, and secondary winding means, a measuring instrument, input terminal means for said instrument, first and second current paths connected to spaced points of said secondary winding means each to deliver when established to said terminal means a separate energization, said transformer means having a characteristic such that said separate energizations deviate from a desired condition of equality for two different values of said electrical quantity, a switch element actuable between first and second operating positions, said switch element being effective when actuated from said first position to said second position to establish said first path, to interrupt said second path and to increase the amount of energization shunted from said terminal means from a zero value to a preselected value effective to equalize said separate energizations, said switch element being additionally effective when actuated from said second position to said first position to establish said second path, to interrupt said first path and to reduce said shunted energization from said preselected value to a zero value, said switch element being ineffective to modify appreciably the impedance external to said secondary winding means in series with said terminal means when actuated between said first and second positions.

References Cited in the file of this patent
UNITED STATES PATENTS

| | | |
|---|---|---|
| 1,126,286 | Roller | Jan. 26, 1915 |
| 1,550,906 | Knopp | Aug. 25, 1925 |
| 1,959,592 | Macadie | May 22, 1934 |
| 2,079,472 | Varley | May 4, 1937 |
| 2,464,061 | Soley | Mar. 8, 1949 |
| 2,521,869 | Petzinger | Sept. 12, 1950 |